US012785494B2

(12) United States Patent
Wallingford et al.

(10) Patent No.: US 12,785,494 B2
(45) Date of Patent: Nov. 3, 2026

(54) HIGH VOLTAGE COVER

(71) Applicant: Schaeffler Technologies AG & Co. KG, Herzogenaurach (DE)

(72) Inventors: Ronnie Wallingford, Copley, OH (US); Nicholas Crane, Macedonia, OH (US); Scott Angel, Marshallville, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 277 days.

(21) Appl. No.: 18/615,349

(22) Filed: Mar. 25, 2024

(65) Prior Publication Data

US 2025/0300521 A1 Sep. 25, 2025

(51) Int. Cl.
*H02K 5/22* (2006.01)
*H02K 5/00* (2006.01)

(52) U.S. Cl.
CPC .................................... *H02K 5/225* (2013.01)

(58) Field of Classification Search
CPC ................................ H02K 5/00; H02K 5/225
USPC ...................................................... 310/71, 89
See application file for complete search history.

(56) References Cited

FOREIGN PATENT DOCUMENTS

| | | | | | |
|---|---|---|---|---|---|
| CN | 215898338 U | * | 2/2022 | | |
| JP | 2020183197 A | * | 11/2020 | | |
| KR | 20140080122 A | * | 6/2014 | ......... | B60R 16/0239 |

* cited by examiner

*Primary Examiner* — Jose A Gonzalez Quinones
(74) *Attorney, Agent, or Firm* — Suiter Swantz IP

(57) ABSTRACT

A high voltage cover may include a plate, legs, L-bends, and a hook. The plate of the high voltage cover may cover an access port leading to high voltage electrical connectors between a power electronics unit and of an electric motor. The hook of the high voltage cover may couple with a plug when the plug is coupled to the power electronics unit. The hook coupling with the plug may prevent uncovering the access power, and similarly the high voltage electrical connectors, until the plug is disconnected. The voltage is thereby removed from the high voltage electrical connectors when the plug is disconnected.

20 Claims, 11 Drawing Sheets

100

200

HIGH VOLTAGE COVER

TECHNICAL FIELD

The present disclosure generally relates to high voltage electrical connectors, and, more particularly, to covers for high voltage electrical connectors.

BACKGROUND

High voltage electrical connections are used in several direct current and three-phase electric machines. The high voltage electrical connections may be adapted for repeated engagement and disengagement during assembly and maintenance. One challenge with the high voltage electrical connections is preventing access to the high voltage electrical connections while a voltage is applied across the high voltage electrical connections while also allowing access to the high voltage electrical connections when voltage is not applied. Therefore, it would be advantageous to provide a device, system, and method that cures the shortcomings described above.

SUMMARY

A high voltage cover is described, in accordance with one or more embodiments of the present disclosure. The high voltage cover may include: a plate defining a plurality of first through holes; and a hook, wherein the plate and the hook define opposing ends of the high voltage cover, wherein a top surface of the hook opens upwards towards a top surface of the plate.

In some aspects, the plate defines a plurality of second through holes.

In some aspects, the plurality of first through holes includes a pair of first through holes, wherein the plurality of second through holes includes a pair of second through holes.

In some aspects, the pair of second through holes are disposed adjacent to the pair of first through holes.

In some aspects, the plurality of first through holes are plain through holes, wherein the plurality of second through holes are countersink through holes.

In some aspects, the hook is bent with an angle between 90-degrees and 180-degrees, inclusive.

In some aspects, the hook includes a U-shape; wherein the U-shape is one of a full U-shape or a partial U-shape.

In some aspects, the high voltage cover is an aluminum high voltage cover.

In some aspects, the high voltage cover includes: a horizontal leg extending from the plate; a first L-bend extending from the horizontal leg, wherein the horizontal leg joins the plate to the first L-bend; a second L-bend extending from the first L-bend, wherein the first L-bend joins the horizontal leg to the second L-bend; and a vertical leg extending from the second L-bend, wherein the second L-bend joins the first L-bend to the vertical leg; wherein the hook extends form the vertical leg, wherein the vertical leg joins the second L-bend to the hook.

In some aspects, the horizontal leg extends from a corner of the plate, wherein the plate and the horizontal leg define a side flush surface.

In some aspects, the plate, the horizontal leg, and the first L-bend are co-planar.

In some aspects, the vertical leg is orthogonal to the plate, the horizontal leg, and the first L-bend.

In some aspects, at least the plate, the horizontal leg, and the first L-bend include a uniform thickness.

In some aspects, the plate, the horizontal leg, the first L-bend, the second L-bend, the vertical leg, and the hook include the uniform thickness.

A high voltage system is described, in accordance with one or more embodiments of the present disclosure. The high voltage system may include: a plate defining a plurality of first through holes; and a hook, wherein the plate and the hook define opposing ends of the high voltage cover, wherein a top surface of the hook opens upwards towards a top surface of the plate; a housing including a plurality of dowels, wherein the housing defines an access port, wherein the plurality of dowels couple to the plurality of first through holes, wherein the plate covers the access port; a power electronics unit; an electric motor; a plug, wherein the plug couples to the power electronics unit, wherein the plug supplies power to the power electronics unit, wherein the top surface of the hook couples to the plug; wherein coupling the top surface of the hook to the plug and coupling the plurality of dowels to the plurality of first through holes prevent movement of the plate relative to the housing; and one or more high voltage electrical connectors, wherein the power electronics unit and the electric motor are coupled by the one or more high voltage electrical connectors, wherein the access port is aligned with the one or more high voltage electrical connectors; wherein the plug is configured to uncouple from the power electronics unit and the top surface of the hook, wherein the high voltage cover is configured to translate along a central axis of the plurality of dowels when the plug is uncoupled from the power electronics unit and the top surface of the hook thereby uncovering the access port from the plate.

In some aspects, the plurality of first through holes includes a pair of first through holes, wherein the plurality of dowels includes a pair of dowels.

In some aspects, the plurality of dowels are disposed adjacent to the access port.

In some aspects, the high voltage system includes a plurality of fasteners, wherein the plate defines a second plurality of through holes, wherein the plurality of fasteners couple the high voltage cover to the housing through the second plurality of through holes.

A method is described, in accordance with one or more embodiments of the present disclosure. The method may include: uncoupling a plug from a power electronics unit and a hook of a high voltage cover; wherein the high voltage cover includes: a plate defining a plurality of first through holes; and the hook, wherein the plate and the hook define opposing ends of the high voltage cover, wherein a top surface of the hook opens upwards towards a top surface of the plate; uncoupling the high voltage cover from a plurality of dowels of a housing by translating the high voltage cover along a central axis of the plurality of dowels thereby uncovering an access port defined by the housing; and uncoupling one or more high voltage electrical connectors between a power electronics unit and an electric motor via the access port.

BRIEF DESCRIPTION OF THE DRAWINGS

The numerous advantages of the disclosure may be better understood by those skilled in the art by reference to the accompanying figures in which.

DETAILED DESCRIPTION OF THE INVENTION

Figure 1A:
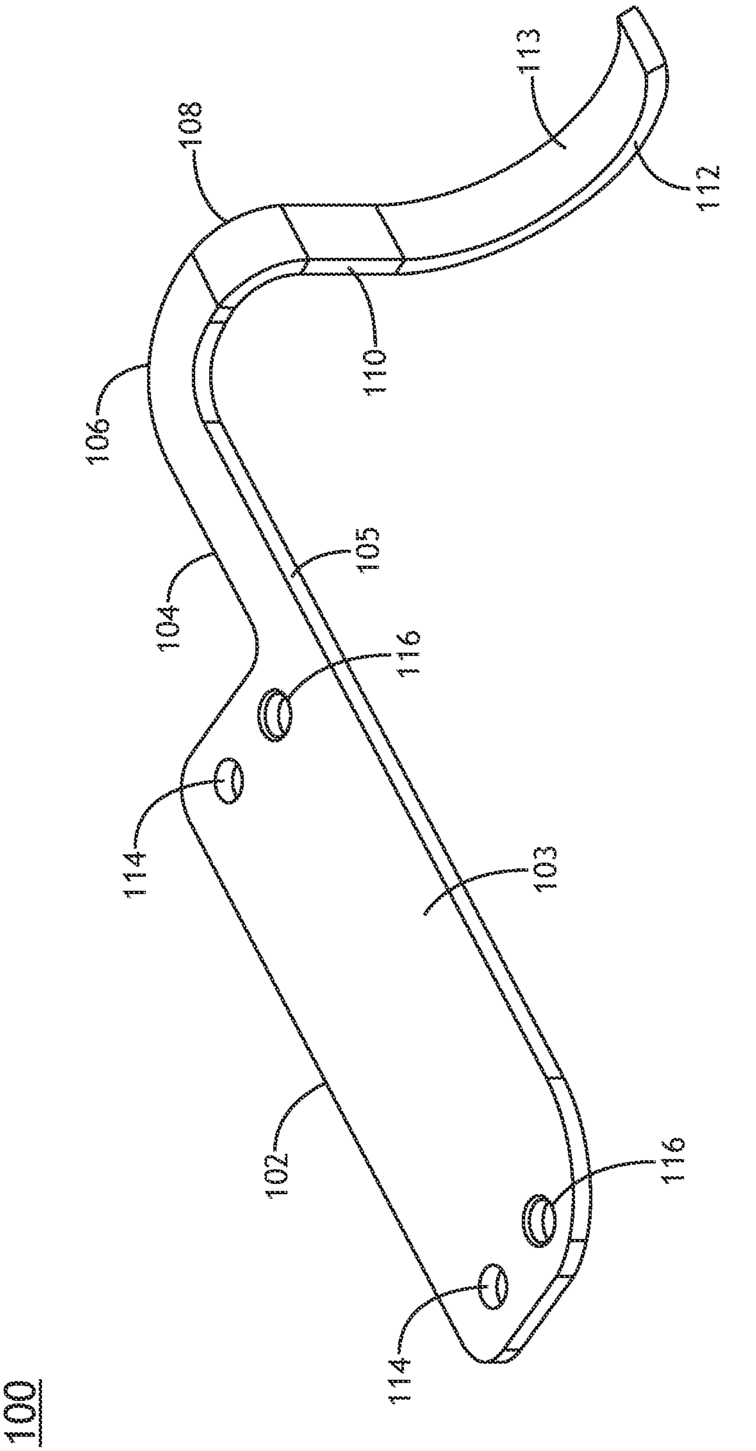
FIG. 1A illustrates a perspective view of a high voltage cover, in accordance with one or more embodiments of the present disclosure.
Figure 1B:
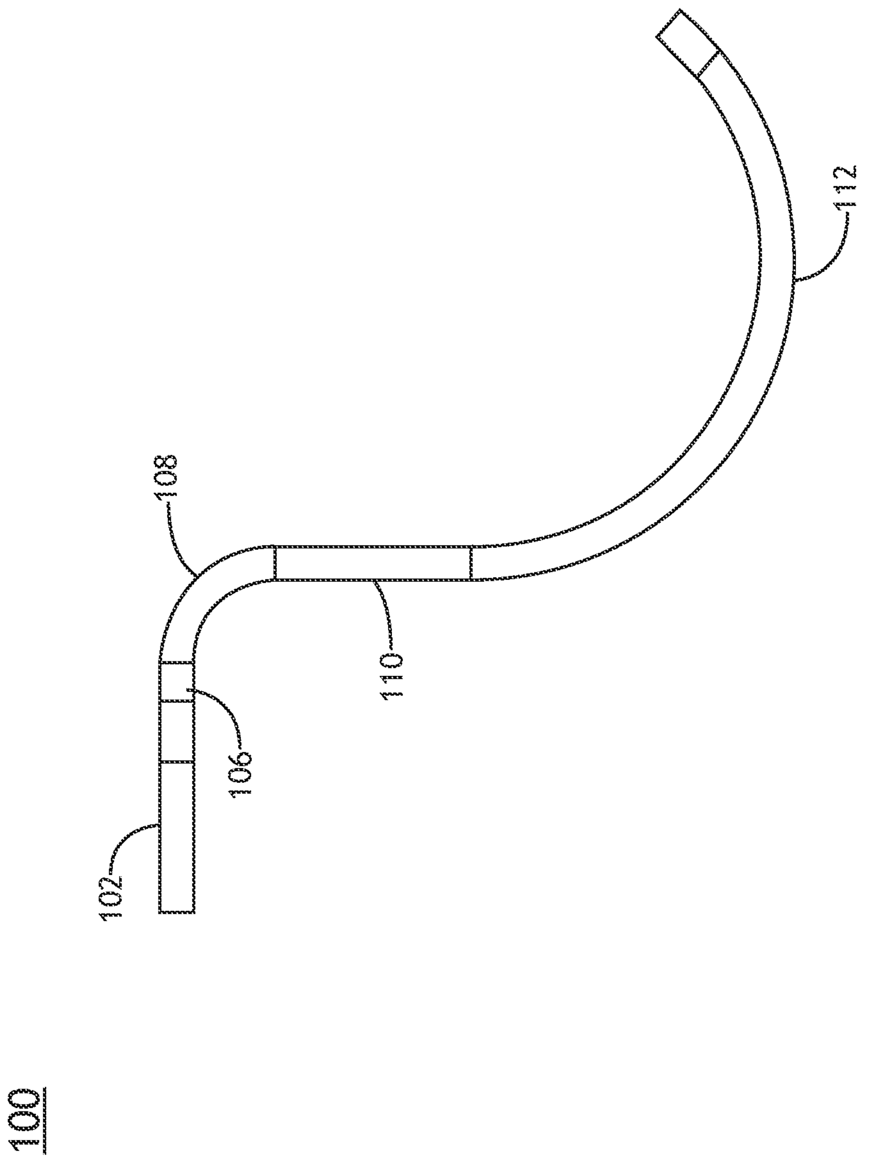
FIG. 1B illustrates a front view of a high voltage cover, in accordance with one or more embodiments of the present disclosure.
Figure 1C:
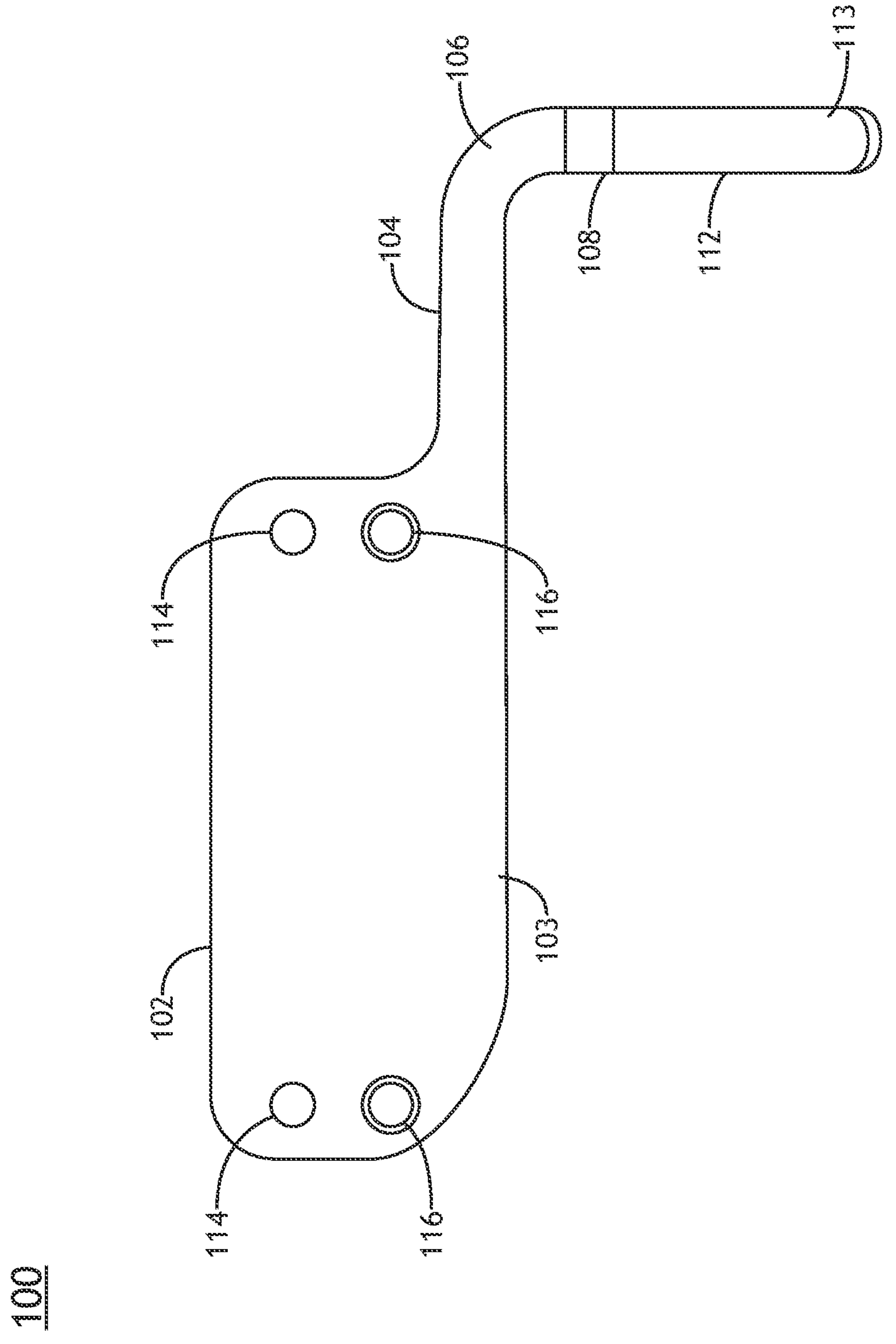
FIG. 1C illustrates a top view of a high voltage cover, in accordance with one or more embodiments of the present disclosure.
Figure 1D:
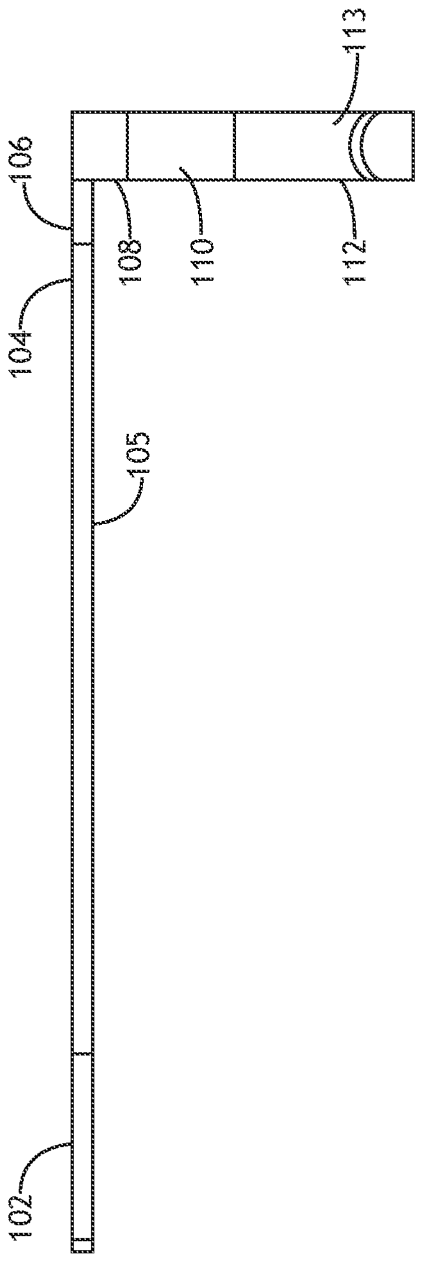
FIG. 1D illustrates a side view of a high voltage cover, in accordance with one or more embodiments of the present disclosure.

Embodiments of the present disclosure are described herein. It is to be understood, however, that the disclosed embodiments are merely examples and other embodiments can take various and alternative forms. The figures are not necessarily to scale; some features could be exaggerated or minimized to show details of components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for applications or implementations.

Embodiments of the present disclosure are directed to a high voltage cover. The high voltage cover may include a plate, legs, L-bends, and a hook. The plate of the high voltage cover may cover an access port leading to high voltage electrical connectors between a power electronics unit and an electric motor. The hook of the high voltage cover may couple with a plug when the plug is coupled to the power electronics unit. The hook coupling with the plug may prevent uncovering the access power, and similarly the high voltage electrical connectors, until the plug is disconnected. The voltage is thereby removed from the high voltage electrical connectors when the plug is disconnected.

FIGS. 1A-1D illustrate a high voltage cover 100, in accordance with one or more embodiments of the present disclosure. The high voltage cover 100 may include a plate 102, horizontal leg 104, L-bend 106, L-bend 108, vertical leg 110, and/or hook 112.

The plate 102 may be a planar member. The plate 102 may be flat along a horizontal plane of the high voltage cover 100. The plate 102 may include a uniform thickness, such that the plate 102 may be thinner than wide or long. In this example, the plate 102 may not include any significant curvature along a horizontal plane. Such a configuration should not be interpreted as a limitation on the scope of the present disclosure as it is contemplated that in some implementations the plate 102 may include curvature along the horizontal plane.

The plate 102 may include one or more corners. The one or more corners may include a sharp edge, fillet, chamfer, or the like. For example, three of the corners may include a fillet. The radius of the fillet may or may not be the same for each of the corners. For example, a first corner and second corner may include the fillet with a first radius and a third corner may include the fillet with a second radius, where the second radius is larger than the first radius.

The plate 102 may define through holes 114 and/or through holes 116. The plate 102 may define the through holes 114 and/or through holes 116 through the thickness of the plate 102. The through holes 114 may be referred to as first through holes and the through holes 116 may be referred to as second through holes. The plate 102 may define any integer number of the through holes 114 and/or the through holes 116. For example, the plate 102 may define a pair of the through holes 114 and/or a pair of the through holes 116. The pair of the through holes 114 may be disposed adjacent to the pair of the through holes 116.

The through holes 114 and/or the through holes 116 may include any suitable cross-section. For example, the through holes 114 and/or the through holes 116 may include a circular cross-section (i.e., cylindrical through holes), a rectangular cross-section (i.e., rectangular through holes), or any n-agonal cross-section where N is an integer of three or greater (i.e., n-agonal through holes).

The plate 102 may define the through holes 114 and/or the through holes 116 as plain through holes, counterbore through holes, and/or countersink through holes. Plain through holes may refer to through holes without a counterbore and without a countersink. The counterbore and/or countersink may be from a top surface 103 of the plate 102. For example, the plate 102 may define the through holes 114 as plain through holes and the through holes 116 as countersink through holes with a countersink from the top surface 103 of the plate 102.

The horizontal leg 104 may extend from the plate 102. For example, the horizontal leg 104 may extend from a corner of the plate 102. A length of the horizontal leg 104 may or may not be less than a length of the plate 102. A width of the horizontal leg 104 may be less than the width of the plate 102.

The plate 102 and the horizontal leg 104 may define a side flush surface 105. For example, the plate 102 and the horizontal leg 104 may define the side flush surface 105 by the horizontal leg 104 extending from the corner of the plate 102. The side flush surface 105 may start from a fillet corner of the plate 102, extend along the plate 102 through the corner of the plate 102 through which the horizontal leg 104 extends, and along the length of the horizontal leg 104 up to the L-bend 106. The side flush surface 105 may be disposed in a vertical plane. The dimensions of the side flush surface 105 in a vertical direction may be based on the thickness of the plate 102 and/or the thickness of the horizontal leg 104. The dimensions of the side flush surface 105 in a lengthwise direction may be the length of the plate 102 plus the length of the horizontal leg 104. The side surface of the plate 102 which is opposed to the side flush surface 105 may be offset from the side surface of the horizontal leg 104 which is opposed to the side flush surface 105. For example, the width of the horizontal leg 104 being less than the width of the plate 102 together with the horizontal leg 104 extending from the corner of the plate 102 may cause the side surfaces of the plate 102 and horizontal leg 104 which are opposed to the side flush surface 105 to be offset from each other. Although the plate 102 and the horizontal leg 104 are described as defining the side flush surface 105, this is not intended as a limitation of the present disclosure. It is further contemplated that the horizontal leg 104 may extend from the plate 102 away from the corner of the plate 102 (i.e., towards a center of the plate 102) such that the sides of the plate 102 may be offset from the sides of the horizontal leg 104.

The L-bend 106 may be referred to as a first L-bend. The L-bend 106 may extend from the horizontal leg 104. The horizontal leg 104 may join the plate 102 to the L-bend 106.

The plate 102, horizontal leg 104, and/or L-bend 106 may be co-planar. For example, the plate 102, horizontal leg 104, and/or L-bend 106 may be co-planar in a horizontal plane. The plate 102, horizontal leg 104, and/or L-bend 106 may be a horizontal or longitudinal part of the high voltage cover 100. For example, the plate 102, horizontal leg 104, and/or L-bend may extend along the longitudinal axis of the high voltage cover 100. Although the plate 102, horizontal leg 104, and/or L-bend 106 are described as being co-planar, this is not intended as a limitation of the present disclosure. It is further contemplated that the plate 102, horizontal leg 104, and/or L-bend 106 may be in offset planes.

The L-bend 108 may be referred to as a second L-bend. The L-bend 108 may extend from the L-bend 106. The L-bend 106 may join the horizontal leg 104 to the L-bend 108.

The L-bend 106 and/or the L-bend 108 may be bent with a selected angle. The L-bend 106 and/or the L-bend 108 may have an angle which is approximately 90-degrees. For example, the L-bend 106 and/or the L-bend 108 may have a 90-degree bend. It is further contemplated that the L-bend 106 and/or the L-bend 108 may vary from the 90-degree bend, without exceeding the scope of the present disclosure.

The vertical leg 110 may extend from the L-bend 108. The L-bend 108 may join the L-bend 106 to the vertical leg 110. The vertical leg 110 may be orthogonal to the plate 102, the horizontal leg 104, and/or the L-bend 106. For example, the vertical leg 110 may be orthogonal to the plate 102, the horizontal leg 104, and/or the L-bend 106 by the L-bend 108 having the 90-degree bend.

The hook 112 may extend from the vertical leg 110. The vertical leg 110 may join the L-bend 108 to the hook 112. The plate 102 and the hook 112 may be define the opposing ends of the high voltage cover 100.

The hook 112 may be bent with a selected angle. The selected angle may be at least 90-degrees, such as, but not limited to, at least 100-degrees, at least 110-degrees, at least 120-degrees, at least 130-degrees, at least 140-degrees, at least 150-degrees, at least 160-degrees, at least 170-degrees, at least 180-degrees, or the like. For example, the hook 112 may have a 160-degree bend. It is further contemplated that the hook 112 may vary from the 160-degree bend, without exceeding the scope of the present disclosure. For instance, the selected angle may be between 90-degrees and 180-degrees, inclusive.

The hook 112 may include a shape, such as, but not limited to, a U-shape, a square shape, a V-shape, or the like. The U-shape may include a full U-shape or a partial U-shape. For example, the hook 112 may include the full U-shape where the hook 112 includes the selected angle which is 180-degrees. By way of another example, the hook 112 may include the partial U-shape where the hook 112 includes the selected angle which is less than 180-degrees.

The hook 112 may include a top surface 113. The top surface 113 of the hook 112 may open upwards towards the top surface 103 of the plate 102. The top surface 113 of the hook 112 may be continuous with the top surface 103 of the plate 102 across the plate 102, horizontal leg 104, L-bend 106, L-bend 108, vertical leg 110, and/or hook 112.

A width of the L-bend 108, a width of the vertical leg 110, and/or a width of the hook 112 may be the same. It is further contemplated that the of the L-bend 108, the width of the vertical leg 110, and/or the width of the hook 112 may be different.

The plate 102, horizontal leg 104, L-bend 106, L-bend 108, vertical leg 110, and/or hook 112 may include a select thickness. For example, the plate 102, horizontal leg 104, L-bend 106, L-bend 108, vertical leg 110, and/or hook 112 may include a uniform thickness. It is further contemplated that the thickness of the high voltage cover 100 may vary slightly due to bend radiuses of the L-bend 106, L-bend 108, and/or hook 112. For instance, elongation due to bending during manufacturing may reduce the thickness of the L-bend 108 and/or hook 112 relative to the plate 102, horizontal leg 104, L-bend 106, and/or vertical leg 110. In this instance, the plate 102, horizontal leg 104, and/or L-bend 106 may include a uniform thickness.

The high voltage cover 100 may be formed from a selected material. The selected material may include but is not limited to aluminum, steel, plastic, or the like. For example, the high voltage cover 100 may be an aluminum high voltage cover. The aluminum high voltage cover may provide electromagnetic compatibility (EMC) and/or provide shielding of electromagnetic interference (EMI). The aluminum high voltage cover may provide minimal corrosion when abutting with aluminum components. By way of another example, the high voltage cover 100 may be a steel high voltage component with a corrosion-prevention coating. The steel high voltage cover may provide electromagnetic compatibility (EMC) and/or provide shielding of electromagnetic interference (EMI). The corrosion-prevention coating may reduce corrosion when abutting with aluminum components. By way of another example, the high voltage cover 100 may be a plastic high voltage component. The plastic high voltage component may not be electromagnetically compatible and/or may not provide shielding of electromagnetic interference but may provide minimal corrosion when abutting with aluminum components.

The high voltage cover 100 may be manufactured via one or more processes. The high voltage cover 100 may be manufactured via stamping, casting, injection molding, or the like. For example, the high voltage cover 100 may be a stamped aluminum high voltage cover. The L-bend 106, L-bend 108, and/or hook 112 may or may not be bent from an aluminum sheet during stamping to define the L-bend 106, L-bend 108, and/or hook 112. For instance, the L-bend 106 may be stamped from the sheet without bending to form the L-bend 106 while the L-bend 108 and hook 112 may stamped from the sheet and bent to form the L-bend 108 and hook 112.

FIGS. 2A-2F illustrates a high voltage system 200, in accordance with one or more embodiments of the present disclosure. The high voltage system 200 may be a high voltage power system. The high voltage system 200 may include the high voltage cover 100, a housing 202, power electronics unit 204, electric motor 206, plug 208, fasteners 212, and/or high voltage electrical connectors 214.

The electric motor 206 may receive one or more phases of current. For example, the electric motor 206 may be a three-phase electric motor and may receive three phases of current, including first-phase (u), second-phase (v), and third-phase (w). The first-phase (u), the second-phase (v), and the third-phase (w) are generally aligned 120-degrees out of phase. By way of another example, the electric motor 206 may be a two-phase electric motor and may receive two phases of current. By way of another example, the electric motor 206 may be a single-phase electric motor and may receive a single phase of current. By way of another example, the electric motor 206 may be receive a direct current (DC) electric motor and receive current which does not oscillate with a phase.

The electric motor 206 may include one or more functions. For example, the electric motor may be a traction drive in a vehicle powertrain or the like.

The power electronics unit 204 may control the current supplied to the electric motor 206, thereby controlling a revolutions per minute of the electric motor 206. For example, the power electronics unit 204 may include an inverter, controller, or the like for controlling the current supplied to the electric motor 206.

The power electronics unit 204 and the electric motor 206 may be coupled by the high voltage electrical connectors 214. The electric motor 206 may receive current from the power electronics unit 204 via the high voltage electrical connectors 214. The high voltage electrical connectors 214 may be rated to carry a high voltage such as, but not limited to as voltage as low as 100-volts of alternating current (VAC) to over 1,000 VAC. The high voltage may also be direct current, such as, but not limited to, as low as 48 volts direct current (VDC) to over 1,000 VDC. The high voltage to which the high voltage electrical connectors 214 may be beneficial to provide adequate power to the electric motor 206.

The high voltage electrical connectors 214 may include, but is not limited to, a bolted interface. For example, the high voltage electrical connectors 214 may be a bolted interface between one or more busbars of the power electronics unit 204 and one or more busbars of the electric motor 206. For instance, the high voltage system 200 may include three of the high voltage electrical connectors 214, one each for carrying a respective phase of current (u, v, w) between the power electronics unit 204 and one or more busbars of the electric motor 206.

The high voltage electrical connectors 214 may be adapted for repeated physical engagement or disengagement for establishing and breaking the electrical connection between the power electronics unit 204 and the electric motor 206. The housing 202 may define an access port 216. The access port 216 may be aligned with the high voltage electrical connectors 214. The high voltage electrical connectors 214 may be coupled and uncoupled the power electronics unit 204 to the electric motor 206 through the access port 216 defined by the housing 202. The ability to couple and uncouple the high voltage electrical connectors 214 from the power electronics unit 204 to the electric motor 206 through an access port 216 may enable servicing the power electronics unit 204 and/or the electric motor 206.

The housing 202 may house the electric motor 206 and/or the high voltage electrical connectors 214 between the power electronics unit 204 and the electric motor 206. The housing 202 may also be referred to as a motor housing. The housing 202 may be made of a select material, such as, but not limited to, aluminum.

The high voltage cover 100 may couple to the housing 202. The plate 102 may abut the housing 202 when the high voltage cover 100 is coupled to the housing 202. The high voltage cover 100 may cover the access port 216 when coupled to the housing 202. For example, the plate 102 of the high voltage cover 100 may cover the access port 216. Covering the access port 216 via the high voltage cover 100 may prevent access to the high voltage electrical connectors 214 via the access port 216. Thus, the high voltage cover 100 may control access to the high voltage electrical connectors 214 between the power electronics unit 204 and the electric motor 206.

In embodiments, the high voltage cover 100 may couple to the housing 202 by the fasteners 212. The fasteners 212 may include, but are not limited to, bolts. The fasteners 212 may include a matching cross-section as the through holes 116. The fasteners 212 may insert from the top surface 103 of the plate 102 through the through holes 116 defined by the plate 102 of the high voltage cover 100 up to the housing 202. The fasteners 212 may couple the high voltage cover 100 to the housing 202 through the through holes 116. For example, the housing 202 may define one or more threaded holes to which the fasteners 212 may couple.

The housing 202 may include dowels 210. The dowels 210 may extend upwards from the housing 202. The dowels 210 may be disposed adjacent to the access port 216. The housing 202 may include any number of the dowels 210. For example, the housing 202 may include a pair of the dowels 210. The dowels 210 may include a matching cross-section as the through holes 114. The dowels 210 may insert from a bottom surface of the plate 102 through the through holes 114 defined by the plate 102 of the high voltage cover 100. The dowels 210 may couple the high voltage cover 100 to the housing 202. For example, the dowels 210 may couple to the through holes 114 of the high voltage cover 100.

The through holes 114 and/or the through holes 116 defined by the plate 102 may receive dowels 210 and fasteners 212, respectively. The through holes 114 and the through holes 116 may include a sufficient size (e.g., diameter where the holes have a circular cross-section) to receive the dowels 210 and fasteners 212, respectively. In embodiments, the through holes 114 and the through holes 116 may include a sufficient size to receive the dowels 210 and fasteners 212, respectively, with a clearance fit.

In embodiments, the fasteners 212 may be uncoupled from the high voltage cover 100. The dowels 210 may constrain the motion of the high voltage cover 100 when the dowels 210 are received by the through holes 114 to one degree-of-freedom (DOF) when the fasteners 212 are uncoupled from the high voltage cover 100. The one degree-of-freedom may include translation of the high voltage cover 100 along a central axis of the dowels 210. The dowels 210 may prevent the high voltage cover 100 from translating in a direction which is not along the central axis of the dowels 210. The dowels 210 may also prevent the high voltage plate from rotating relative to the dowels 210 about a roll angle, a yaw angle (i.e., about the central axis of the dowels 210), and/or a pitch angle. Thus, the dowels 210 may form a prismatic joint with the high voltage cover 100. For example, the dowels 210 may be received by the through holes 114 when the high voltage cover 100 is lowered onto the access port 216 and may be removed from the through holes 114 when the high voltage cover 100 is raised from the access port 216.

The plug 208 may couple to the power electronics unit 204. The plug 208 may supply power to the power electronics unit 204. Thus, the high voltage electrical connectors 214 may include voltage when the plug 208 is coupled to the power electronics unit 204. The plug 208 may also uncouple from the power electronics unit 204. No power is supplied to the power electronics unit 204 when the plug 208 is uncoupled from the power electronics unit 204. The high voltage electrical connectors 214 may not include voltage when the plug 208 is coupled to the power electronics unit 204.

The plate 102 of the high voltage cover 100 may couple to the dowels 210. For example, the through holes 114 may couple to the dowels 210 thereby coupling the plate 102 to the dowels 210. The hook 112 of the high voltage cover 100 may couple to the plug 208. For example, the top surface 113 of the hook 112 may couple to the plug 208 thereby coupling the hook 112 to the plug 208.

The high voltage cover 100 may include a design geometry that interlocks the high voltage cover 100 with the dowels 210 and the plug 208. The high voltage cover 100 may couple to both the plug 208 and the dowels 210. Coupling the high voltage cover 100 to both the plug 208 and the dowels 210 may interlock the high voltage cover 100. For example, coupling the top surface 113 of the hook 112 to the plug 208 and coupling the dowels 210 to the through holes 114 may prevent movement of the plate 102 relative to the housing 202 (e.g., prevent the high voltage cover 100 from translating in the direction along the central axis of the dowels 210, any other translation, and any rotation). The dowels 210 may only allow the high voltage cover 100 to translate along the central axis but the coupling between the hook 112 and the plug 208 prevents such translation. The high voltage cover 100 may include 0 degrees-of-freedom while coupled to the dowels 210 and the plug 208 and while the plug 208 is coupled to the power electronics unit 204 due to the plug 208 preventing the high voltage cover 100 from translating. Coupling the high voltage cover 100 with the dowels 210 and the plug 208 may prevent uncoupling the high voltage cover 100 from the housing 202 while the plug 208 is coupled to the power electronics unit 204. Thus, the high voltage cover 100 may prevent access to the high voltage electrical connectors 214 via the access port 216 while the plug 208 is coupled to the power electronics unit 204. Preventing access via the access port 216 while the plug 208 is coupled to the power electronics unit 204 may reduce a risk of shock associated with the high voltage electrical connectors 214.

The high voltage cover 100 may be prevented from uncoupling from the housing 202 while the plug 208 is coupled to the power electronics unit 204 regardless of whether the fasteners 212 are coupled to or uncoupled from the high voltage cover 100. The geometry of the high voltage cover 100, in tandem with dowels 210 extending from the housing 202, may prevent the removal of the high voltage cover 100 while the plug 208 is coupled to the power electronics unit 204 even if the fasteners 212 are removed. However, the fasteners 212 may be beneficial to reduce vibration of the high voltage cover 100 (e.g., vibration due motion) and/or to provide a watertight seal between the plate 102 and the housing 202. For example, the fasteners 212 may act as clamps to provide a watertight fitment.

The plug 208 may also be configured to uncouple from the power electronics unit 204 and the top surface 113 of the hook 112. The high voltage cover 100 may uncouple from the housing 202 when the plug 208 is uncoupled from the power electronics unit 204 and uncoupled from the top surface 113 of the hook 112. The high voltage cover 100 may be configured to translate along the central axis of the dowels 210 when the plug 208 is uncoupled from the power electronics unit 204 and the top surface 113 of the hook 112. The translation of the high voltage cover 100 may uncouple the high voltage cover 100 from the housing 202 and uncover the access port 216 from the plate 102. The access port 216 may be uncovered and may provide access to couple and/or uncouple the electric motor 206 and the power electronics unit 204 via the high voltage electrical connectors 214 when the plug 208 is uncoupled from the power electronics unit 204 and the high voltage cover 100 is uncoupled from the housing 202. Thus, the high voltage cover 100 may enable access to the access port 216 when the plug 208 is uncoupled from the power electronics unit 204 thereby enabling the high voltage cover 100 to uncouple from the dowels 210.

In embodiments, the high voltage cover 100 may not cause corrosion with the housing 202 when the plate 102 abuts the housing 202. For example, the material of the high voltage cover 100 may be selected to prevent the corrosion. For instance, the high voltage cover 100 may include aluminum, steel with a corrosion-prevention coating, plastic, or the like to prevent corrosion with the housing 202.

In embodiments, the high voltage cover 100 may provide electromagnetic compatibility (EMC) and/or provide shielding of electromagnetic interference (EMI). For example, the high voltage cover 100 may be an aluminum high voltage cover which may provide the electromagnetic compatibility (EMC) and/or the shielding of electromagnetic interference (EMI) for the electric motor 206.

Figure 2A:
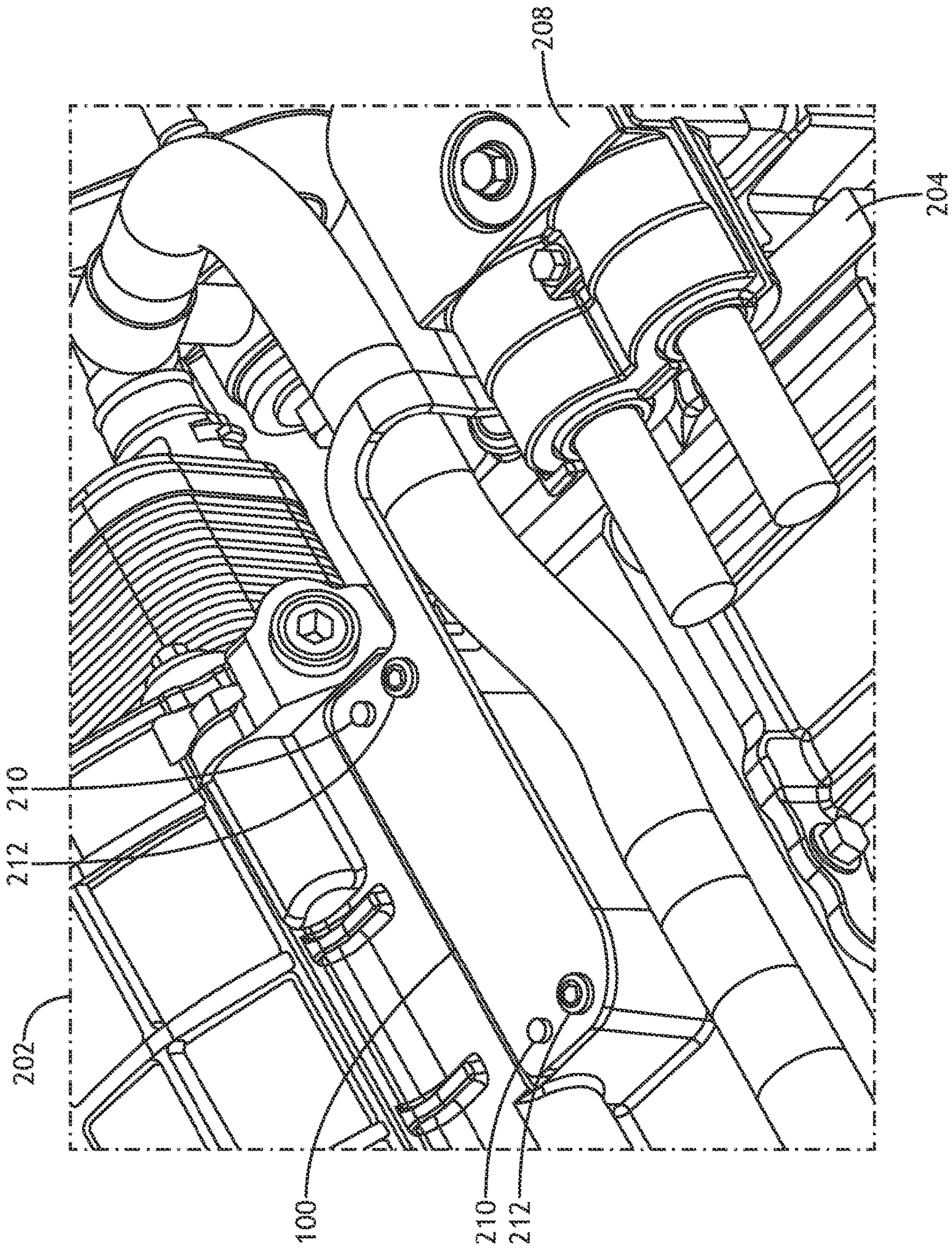
FIG. 2A illustrates a perspective view of a high voltage system including the high voltage cover, in accordance with one or more embodiments of the present disclosure.
Figure 2B:
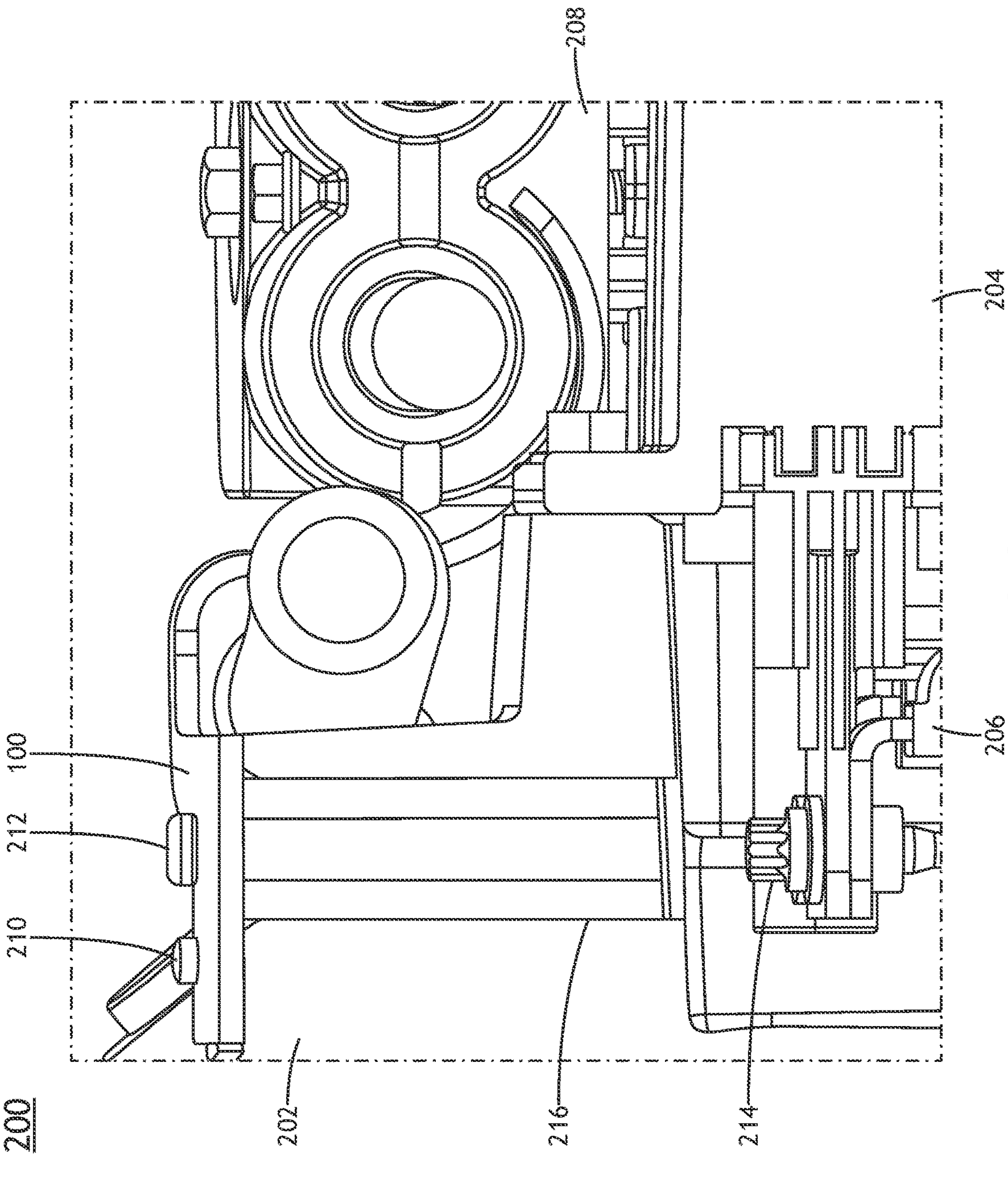
FIG. 2B illustrates a cross-section view of a plug which is coupled to a power electronics unit and a hook of the high voltage cover, in accordance with one or more embodiments of the present disclosure.
Figure 2C:
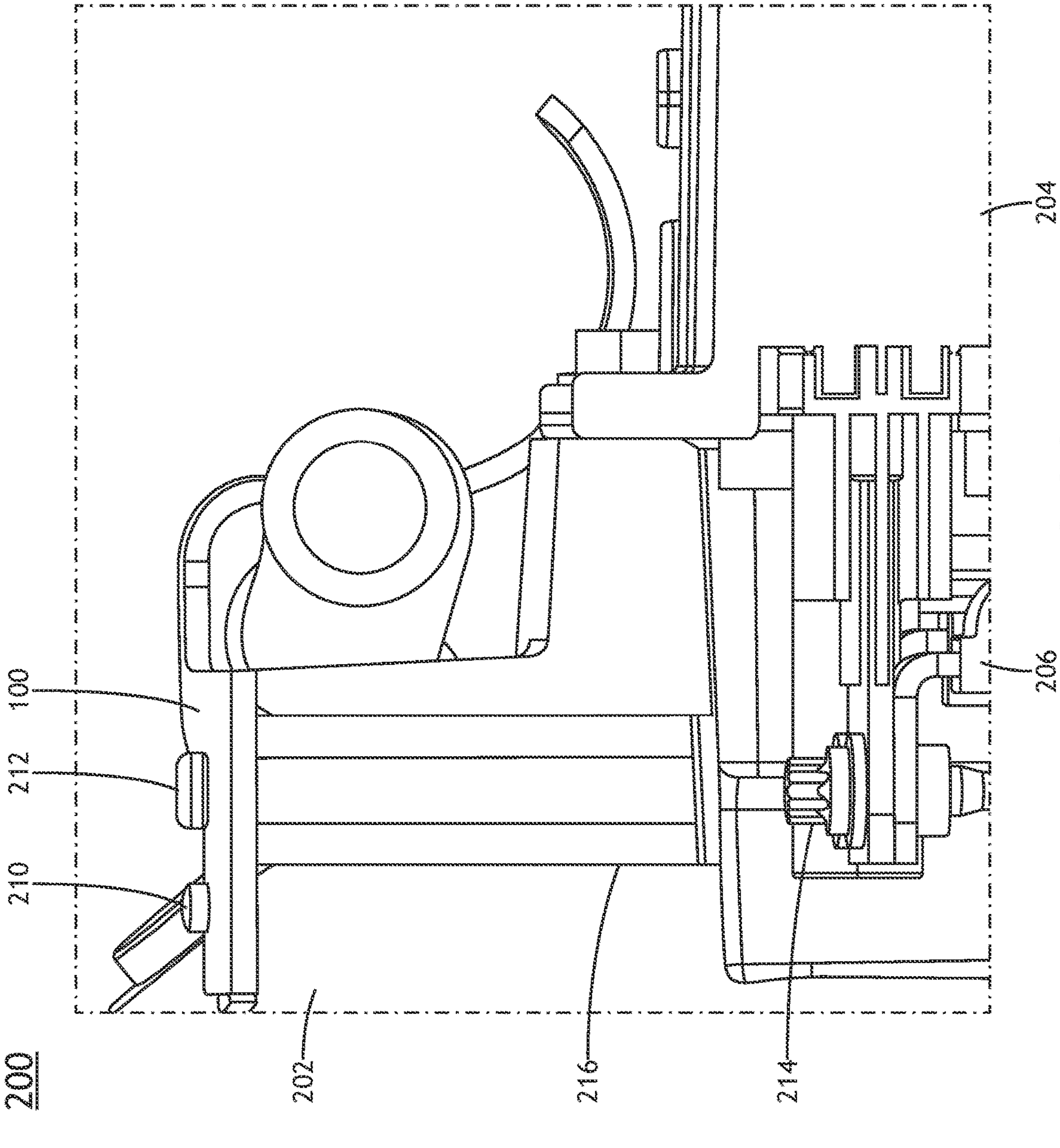
FIG. 2C illustrates a cross-section view after uncoupling the plug from the power electronics unit and the hook, in accordance with one or more embodiments of the present disclosure.
Figure 2D:
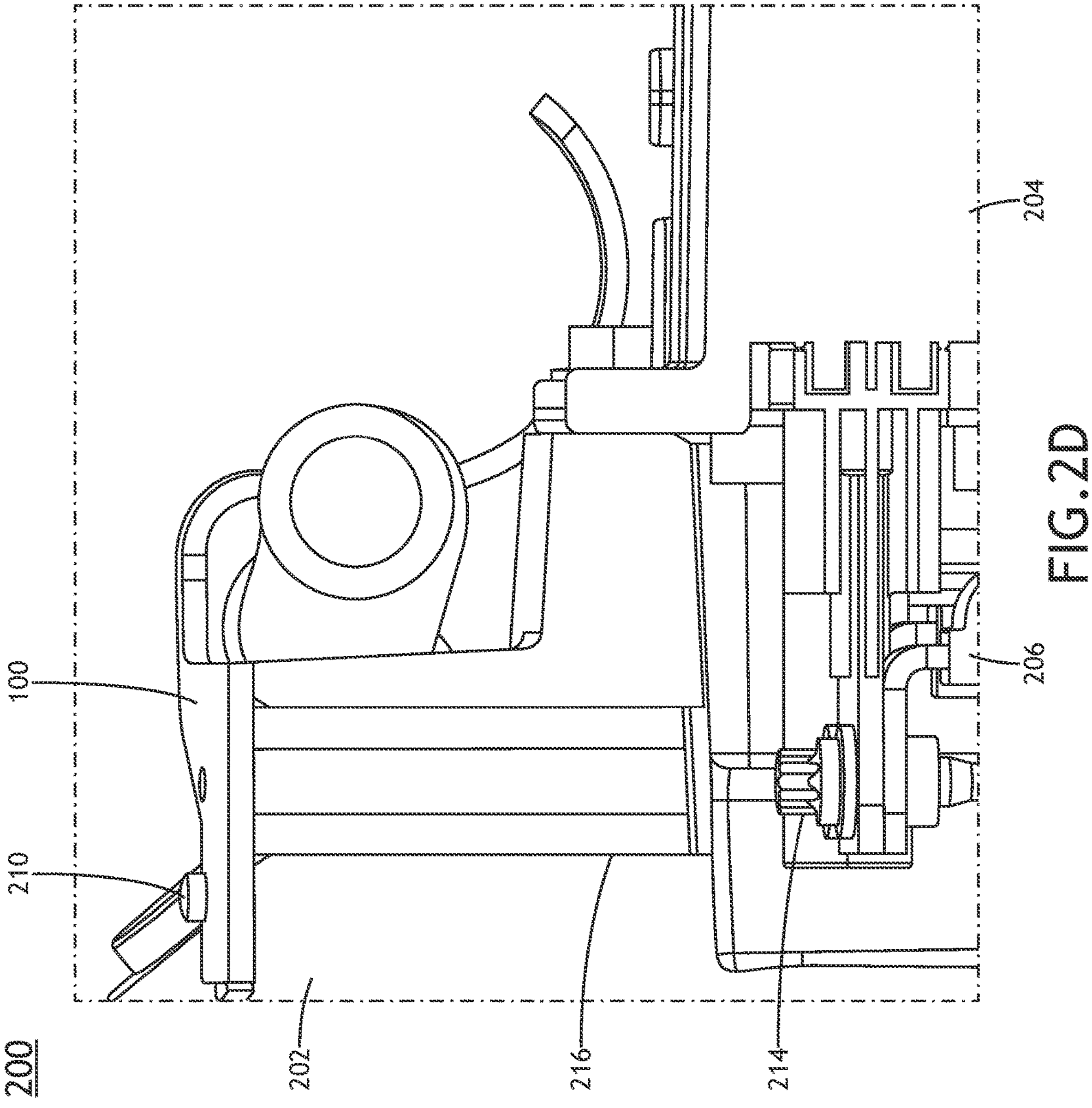
FIG. 2D illustrates a cross-section view after uncoupling fasteners between the high voltage cover and a housing, in accordance with one or more embodiments of the present disclosure.
Figure 2E:
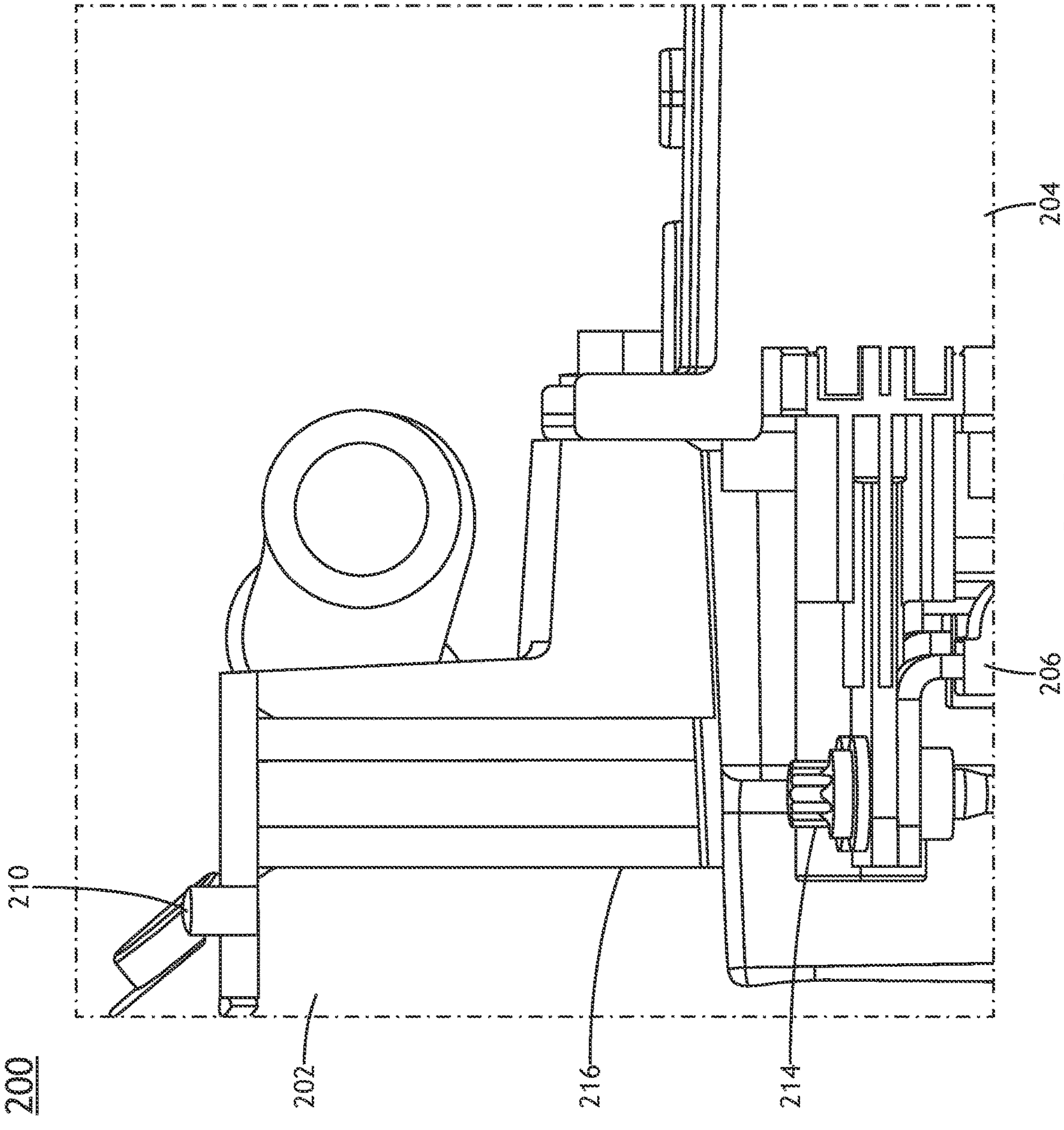
FIG. 2E illustrates a cross-section view after uncoupling the high voltage cover from dowels, in accordance with one or more embodiments of the present disclosure.
Figure 2F:
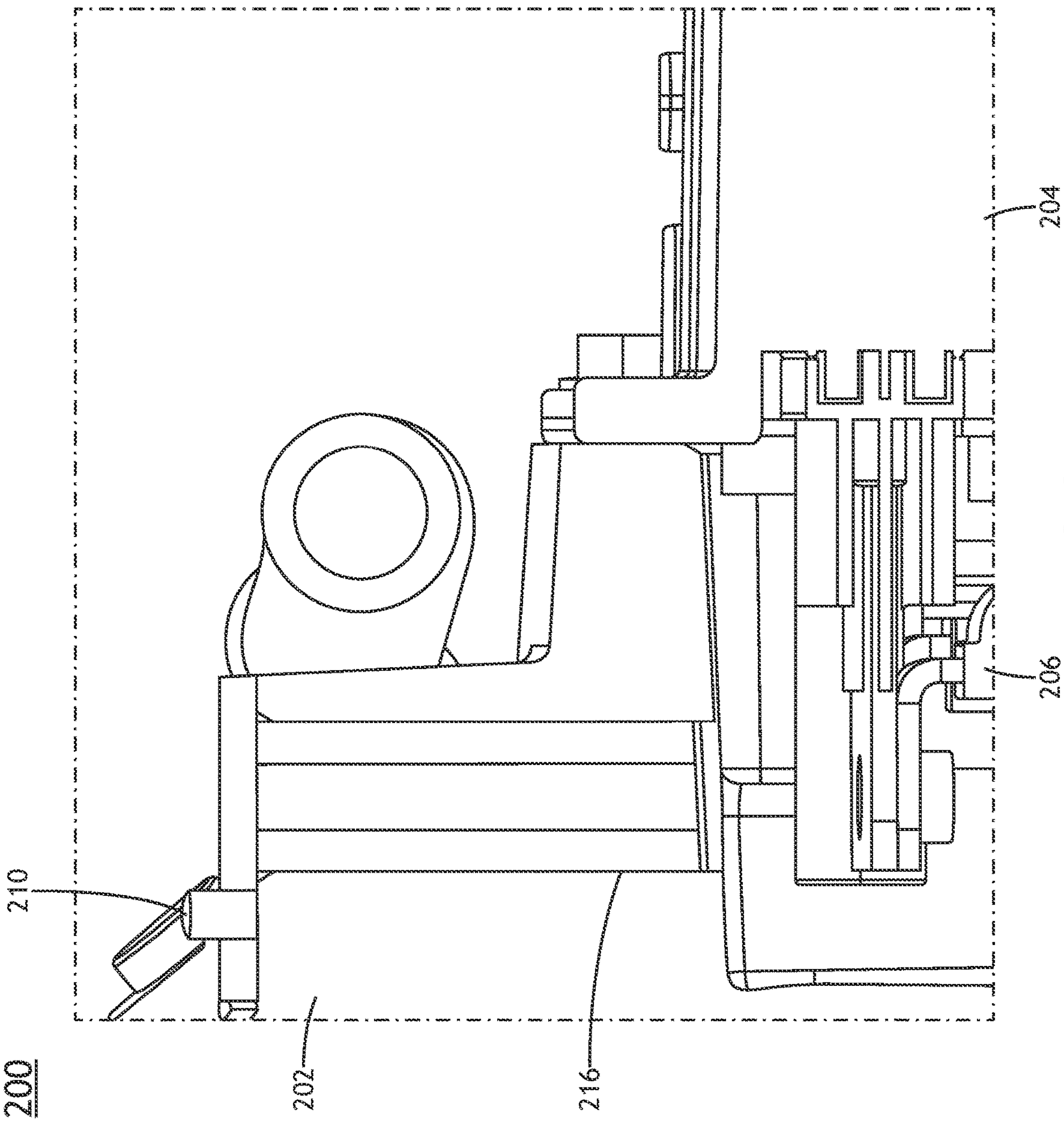
FIG. 2F illustrates a cross-section view after uncoupling the high voltage electrical connectors between the power electronics unit and the electric motor, in accordance with one or more embodiments of the present disclosure.
Figure 3:
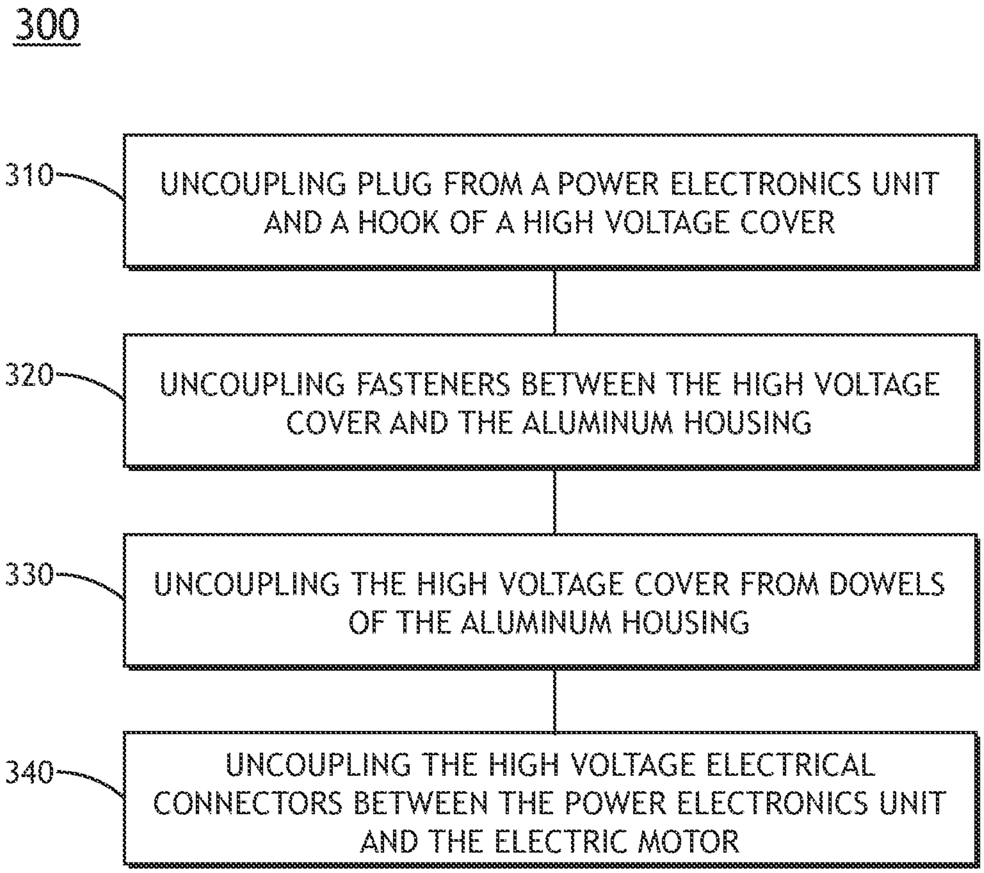
FIG. 3 illustrates a flow diagram of a method, in accordance with one or more embodiments of the present disclosure.

FIG. 3 illustrates a flow diagram of a method 300, in accordance with one or more embodiments of the present disclosure. The method 300 provides a means for electrically coupling and uncoupling the high voltage electrical connectors 214. The embodiments and the enabling technology described previously herein in the context of the high voltage cover 100 and the high voltage system 200 should be interpreted to extend to the method 300. It is further recognized, however, that the method is not limited to the high voltage cover 100 and the high voltage system 200. The method 300 may be further understood with reference to FIGS. 2B-2F.

In a step 310, a plug may be uncoupled from a power electronics unit and a hook of a high voltage cover. For example, the plug 208 may be uncoupled from the power electronics unit 204 and the hook 112 of the high voltage cover 100. For instance, the plug 208 may be uncoupled from the top surface 113 of the hook 112. The plug 208 may be uncoupled from the power electronics unit 204 and the hook 112 of the high voltage cover 100 while the high voltage cover 100 is coupled to the housing 202. Uncoupling the plug 208 from the power electronics unit 204 may remove the voltage from the high voltage electrical connectors 214. FIG. 2B illustrates a cross-section view of the plug 208 which is coupled to the power electronics unit 204 and the hook 112. FIG. 2C illustrates a cross-section view of after uncoupling the plug 208 from the power electronics unit 204 and the hook 112.

In a step 320, fasteners may be uncoupled between the high voltage cover and the housing. For example, the fasteners 212 may be uncoupled between the high voltage cover 100 and the housing 202. It is contemplated that the fasteners 212 may be uncoupled between the high voltage cover 100 and the housing 202 before or after the plug 208 is uncoupled from the power electronics unit 204 and the hook 112 (i.e., the step 320 may be performed before or after the step 310). FIG. 2D illustrates a cross-section view after uncoupling the fasteners 212 between the high voltage cover 100 and the housing 202.

In a step 330, the high voltage cover may be uncoupled from dowels of the housing. For example, the high voltage cover 100 may be uncoupled from dowels 210 of the housing 202. The dowels 210 may be uncoupled from the through holes 114 defined by the plate 102 of the high voltage cover 100. The high voltage cover 100 may be uncoupled from dowels 210 of the housing 202 translating the high voltage cover 100 along the central axis of the dowels 210. Translating the high voltage cover 100 along the central axis of the dowels 210 may uncover the access port 216. The high voltage cover 100 may be uncoupled from the dowels 210 of the housing 202 while the plug 208 is uncoupled from the power electronics unit 204 and the hook 112 and the fasteners 212 are uncoupled between the high voltage cover 100 and the housing 202 (i.e., the step 330 may be performed only after both the step 310 and the step 320). FIG. 2E illustrates a cross-section view after uncoupling the high voltage cover 100 from the dowels 210.

In a step 340, the high voltage electrical connectors may be uncoupled between the power electronics unit and the electric motor. For example, the high voltage electrical connectors 214 may be uncoupled between the power electronics unit 204 and the electric motor 206. The high voltage electrical connectors 214 may be uncoupled between the power electronics unit 204 and the electric motor 206 via the access port 216. The high voltage electrical connectors 214 may be uncoupled between the power electronics unit 204 and the electric motor 206 via the access port 216 after the high voltage cover 100 is uncoupled from the dowels 210 of the housing 202 (i.e. the step 340 may be performed after the step 330). FIG. 2F illustrates a cross-section view after uncoupling the high voltage electrical connectors 214 between the power electronics unit 204 and the electric motor 206.

Referring generally again to the figures. Although the high voltage system 200 is described as including the fasteners 212 being bolts which couple to threaded holes of the housing 202, this is not intended as a limitation of the present disclosure. It is further contemplated that the fasteners 212 may include cotter pins. The dowels 210 may define one or more through holes to which the cotter pins may couple. The cotter pins may then couple the high voltage cover 100 to the dowels 210 of the housing 202. The high voltage cover 100 may not define the through holes 116 in such a configuration where the cotter pins couple the high voltage cover 100 to the dowels 210 of the housing 202.

One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, to the extent any embodiments are described as less desirable than other embodiments or prior art implementations with respect to one or more characteristics, these embodiments are not outside the scope of the disclosure and can be desirable for applications.

LIST OF REFERENCE NUMBERS

100 high voltage cover
102 plate
103 top surface
104 horizontal leg
105
106 L-bend
108 L-bend
110 vertical leg
112 hook
113 top surface
114 through holes
116 through holes
200 high voltage system
202 housing
204 power electronics unit
206 electric motor
208 plug
210 dowels
212 fasteners
214 high voltage electrical connectors
216 access port

What is claimed:

1. A high voltage system comprising:

a high voltage cover comprising:

a plate defining a plurality of first through holes; and a hook, wherein the plate and the hook define opposing ends of the high voltage cover, wherein a top surface of the hook opens upwards towards a top surface of the plate;

a housing comprising a plurality of dowels, wherein the housing defines an access port, wherein the plurality of dowels couple to the plurality of first through holes, wherein the plate covers the access port;

a power electronics unit;

an electric motor;

a plug, wherein the plug couples to the power electronics unit, wherein the plug supplies power to the power electronics unit, wherein the top surface of the hook couples to the plug; wherein coupling the top surface of the hook to the plug and coupling the plurality of dowels to the plurality of first through holes prevent movement of the plate relative to the housing; and one or more high voltage electrical connectors, wherein the power electronics unit and the electric motor are coupled by the one or more high voltage electrical connectors, wherein the access port is aligned with the one or more high voltage electrical connectors;

wherein the plug is configured to uncouple from the power electronics unit and the top surface of the hook, wherein the high voltage cover is configured to translate along a central axis of the plurality of dowels when the plug is uncoupled from the power electronics unit and the top surface of the hook thereby uncovering the access port from the plate.

2. The high voltage system of claim 1, wherein the plurality of first through holes comprises a pair of first through holes, wherein the plurality of dowels comprises a pair of dowels.

3. The high voltage system of claim 1, wherein the plurality of dowels are disposed adjacent to the access port.

4. The high voltage system of claim 1, comprising a plurality of fasteners, wherein the plate defines a second plurality of through holes, wherein the plurality of fasteners couple the high voltage cover to the housing through the second plurality of through holes.

5. A method comprising:

uncoupling a plug from a power electronics unit and a hook of a high voltage cover; wherein the high voltage cover comprises:

a plate defining a plurality of first through holes; and the hook, wherein the plate and the hook define opposing ends of the high voltage cover, wherein a top surface of the hook opens upwards towards a top surface of the plate;

uncoupling the high voltage cover from a plurality of dowels of a housing by translating the high voltage cover along a central axis of the plurality of dowels thereby uncovering an access port defined by the housing; and uncoupling one or more high voltage electrical connectors between a power electronics unit and an electric motor via the access port.

6. The high voltage system of claim 1, wherein the plate defines a plurality of second through holes.

7. The high voltage system of claim 6, wherein the plurality of first through holes comprises a pair of first through holes, wherein the plurality of second through holes comprises a pair of second through holes.

8. The high voltage system of claim 7, wherein the pair of second through holes are disposed adjacent to the pair of first through holes.

9. The high voltage system of claim 6, wherein the plurality of first through holes are plain through holes, wherein the plurality of second through holes are countersink through holes.

10. The high voltage system of claim 1, wherein the hook is bent with an angle between 90-degrees and 180-degrees, inclusive.

11. The high voltage system of claim 10, wherein the hook comprises a U-shape; wherein the U-shape is one of a full U-shape or a partial U-shape.

12. The high voltage system of claim 1, wherein the high voltage cover is an aluminum high voltage cover.

13. The high voltage system of claim 1, comprising:

a horizontal leg extending from the plate;

a first L-bend extending from the horizontal leg, wherein the horizontal leg joins the plate to the first L-bend;

a second L-bend extending from the first L-bend, wherein the first L-bend joins the horizontal leg to the second L-bend; and a vertical leg extending from the second L-bend, wherein the second L-bend joins the first L-bend to the vertical leg;

wherein the hook extends from the vertical leg, wherein the vertical leg joins the second L-bend to the hook.

14. The high voltage system of claim 13, wherein the horizontal leg extends from a corner of the plate, wherein the plate and the horizontal leg define a side flush surface.

15. The high voltage system of claim 13, wherein the plate, the horizontal leg, and the first L-bend are co-planar.

16. The high voltage system of claim 15, wherein the vertical leg is orthogonal to the plate, the horizontal leg, and the first L-bend.

17. The high voltage system of claim 13, wherein at least the plate, the horizontal leg, and the first L-bend comprise a uniform thickness.

18. The high voltage system of claim 17, wherein the plate, the horizontal leg, the first L-bend, the second L-bend, the vertical leg, and the hook comprise the uniform thickness.

19. The high voltage system of claim 1, wherein the one or more high voltage electrical connectors comprise a bolted interface.

20. The high voltage system of claim 1, wherein the electric motor is a three-phase electric motor, wherein the one or more high voltage electrical connectors comprise three high voltage electrical connectors.

* * * * *